(12) United States Patent
Wajnikonis

(10) Patent No.: US 11,434,699 B2
(45) Date of Patent: Sep. 6, 2022

(54) MECHANICAL CONNECTOR OF LONG TORSIONAL AND BENDING FATIGUE LIFE

(71) Applicant: Krzysztof Jan Wajnikonis, Fresno, TX (US)

(72) Inventor: Krzysztof Jan Wajnikonis, Arcola, TX (US)

(*) Notice: Subject to any disclaimer, the term of this patent is extended or adjusted under 35 U.S.C. 154(b) by 0 days.

(21) Appl. No.: 15/239,696

(22) PCT Filed: Apr. 18, 2016

(86) PCT No.: PCT/US2016/028033
§ 371 (c)(1),
(2) Date: Aug. 17, 2016

(87) PCT Pub. No.: WO2016/168797
PCT Pub. Date: Oct. 20, 2016

(65) Prior Publication Data
US 2017/0175459 A1    Jun. 22, 2017

Related U.S. Application Data

(60) Provisional application No. 62/148,665, filed on Apr. 16, 2015, provisional application No. 62/189,437, filed on Jul. 7, 2015.

(51) Int. Cl.
*F16L 15/08* (2006.01)
*E21B 17/02* (2006.01)
(Continued)

(52) U.S. Cl.
CPC ............ *E21B 17/02* (2013.01); *E21B 17/042* (2013.01); *E21B 17/046* (2013.01);
(Continued)

(58) Field of Classification Search
USPC ....... 285/333, 334, 390, 403, 404, 913, 330, 285/391
See application file for complete search history.

(56) References Cited

U.S. PATENT DOCUMENTS

| | | | | |
|---|---|---|---|---|
| 1,589,781 A | * | 6/1926 | Anderson | E21B 17/046 285/330 |
| 2,314,867 A | * | 3/1943 | Boynton | E21B 17/046 285/111 |

(Continued)

FOREIGN PATENT DOCUMENTS

| AU | 2008211995 B2 | 4/2009 |
|---|---|---|
| AU | 2010238542 B2 | 11/2010 |

(Continued)

OTHER PUBLICATIONS

Merlin Connector make-up; Oil States Industry animation slide set, Between 5 and 30 years old; downloaded in Nov. 2018.
(Continued)

*Primary Examiner* — Aaron M Dunwoody

(57) ABSTRACT

This invention builds up on technical features and on the industry experience with the use of Merlin™ family connectors. In addition to friction, structural means utilized in order to transfer high torsional loads include: dog-clutch teeth, shear pins, keys, splines and interlocked thread systems, all used in isolation or in arbitrary combinations. Static and fatigue bending load capacities of the connectors remain high, while the axial load capacities may or may not be high, depending on the design requirements. Connectors according to this invention can be built as new, carefully optimized designs. In some cases upgrading existing Merlin™ family connector designs to increase they torque transfer capacities may be also feasible.

14 Claims, 5 Drawing Sheets

(51) Int. Cl.
*E21B 17/042* (2006.01)
*F16L 15/00* (2006.01)
*E21B 17/046* (2006.01)
*E21B 17/00* (2006.01)
*F16L 25/00* (2006.01)

(52) U.S. Cl.
CPC ........... *F16L 15/002* (2013.01); *F16L 15/003* (2013.01); *F16L 15/08* (2013.01); *E21B 17/00* (2013.01); *F16L 25/00* (2013.01)

(56) References Cited

U.S. PATENT DOCUMENTS

| | | | | |
|---|---|---|---|---|
| 4,525,001 A * | 6/1985 | Lumsden | ............... | B23P 11/022 285/328 |
| 4,629,221 A * | 12/1986 | Lumsden | ................ | E02D 5/523 285/328 |
| 5,101,915 A * | 4/1992 | Witte | ....................... | E21B 7/067 175/320 |
| 5,248,004 A * | 9/1993 | Witte | ....................... | E21B 7/067 175/325.2 |
| 5,474,334 A * | 12/1995 | Eppink | ................... | E21B 7/067 175/74 |
| 5,681,059 A * | 10/1997 | Mackie | ................. | B63B 21/502 285/328 |
| 5,785,357 A * | 7/1998 | Foster | ...................... | F16L 15/08 285/322 |
| 5,810,401 A * | 9/1998 | Mosing | ............... | E21B 17/0426 285/333 |
| 5,954,374 A * | 9/1999 | Gallagher | ............. | E21B 17/046 285/332 |
| 5,964,486 A * | 10/1999 | Sinclair | ................ | F16L 15/004 285/331 |
| 6,047,997 A * | 4/2000 | Olivier | .................... | F16L 15/08 285/331 |
| 6,322,110 B1 * | 11/2001 | Banker | ................. | E21B 17/042 285/333 |
| 6,485,061 B1 * | 11/2002 | Mosing | ................. | F16L 15/008 285/333 |
| 6,485,063 B1 * | 11/2002 | Olivier | .................. | E21B 17/042 285/331 |
| 6,863,313 B1 * | 3/2005 | DeLange | .............. | E21B 17/042 285/329 |
| 7,213,655 B2 * | 5/2007 | Parrott | .................... | E21B 43/11 166/240 |
| 7,434,848 B2 * | 10/2008 | Boyd | ........................ | E21B 17/04 285/330 |
| 7,699,361 B2 * | 4/2010 | Verger | .................. | E21B 43/103 285/333 |
| 8,056,940 B2 | 11/2011 | Morgan et al. | | |
| 8,500,176 B2 * | 8/2013 | Marchand | ............... | E21B 7/067 285/330 |
| 8,550,171 B2 | 10/2013 | Wajnikonis et al. | | |
| 8,689,882 B2 | 4/2014 | Wajnikonis et al. | | |
| 8,690,200 B1 * | 4/2014 | Patterson, Jr. | .......... | E21B 17/08 285/403 |
| 2005/0087985 A1 * | 4/2005 | Mosing | ............... | F16L 37/2445 285/391 |
| 2005/0212290 A1 * | 9/2005 | Durand | ................. | F16L 15/004 285/333 |
| 2007/0132236 A1 * | 6/2007 | Dubedout | ............... | E21B 43/106 285/333 |
| 2011/0068574 A1 * | 3/2011 | Morgan | ............... | E21B 17/046 285/333 |
| 2011/0227338 A1 * | 9/2011 | Pollack | .................. | F16L 15/004 285/355 |
| 2012/0012301 A1 * | 1/2012 | Hughes | ................. | E21B 17/028 166/65.1 |
| 2014/0167408 A1 * | 6/2014 | Steen | ...................... | F16L 15/08 285/330 |
| 2014/0251694 A1 * | 9/2014 | Crane | ................... | F16K 15/147 175/73 |
| 2014/0265320 A1 * | 9/2014 | Pollack | ................. | E21B 17/042 285/334 |
| 2014/0300104 A1 * | 10/2014 | Pollack | ................... | F16L 15/00 285/333 |

FOREIGN PATENT DOCUMENTS

| | | |
|---|---|---|
| EP | 0803637 A2 | 10/1997 |
| EP | 0803637 A2 | 10/1997 |
| EP | 2042682 A3 | 12/2013 |
| GB | 2033518 A | 5/1980 |
| GB | 1573945 | 8/1980 |
| GB | 1573945 A | 8/1980 |
| GB | 2033518 A | 8/1980 |
| GB | 2099529 A | 12/1982 |
| GB | 2099529 A | 12/1982 |
| GB | 2113335 A | 8/1983 |
| GB | 2113335 A | 8/1983 |
| GB | 2556700 | 2/2021 |
| GB | 2556691 | 5/2021 |
| GB | 2591877 | 11/2021 |
| GB | 2591878 | 11/2021 |
| GB | 2591879 | 11/2021 |
| GB | 2591880 | 11/2021 |
| WO | WO 2016/168797 A1 | 10/2016 |
| WO | WO 2016/191637 A1 | 12/2016 |

OTHER PUBLICATIONS

J. D. McGugan, GB 2,033,518 A, issued May 21, 1980.
J. D. McGugan, GB 1,573,945, issued Aug. 28, 1980.
J. D. McGugan, GB 2,099,529 A, issued Dec. 8, 1982.
N. Lumsden, B. K. Phillips, GB 2,113,335 A, issued Aug. 3, 1983.
J. Gallagher, EP 0,803,637 A2, issued Oct. 29, 1997.
D.M. Sinclair, U.S. Pat. No. 5,964,486, issued Oct. 12, 1999.
D.J.E. Morgan, D.M. Sinclair, U.S. Pat. No. 8,056,940, issued Nov. 15, 2011.
K.J. Wajnikonis, WO 2016/168,797 A1, issued Oct. 20, 2016.
K.J. Wajnikonis, GB2,556,691 (patent)/ /GB 1716766.9 (application), issued May 12, 2021.
K.J. Wajnikonis, GB2,591,877, issued Nov. 9, 2021.
K.J. Wajnikonis, GB2,591,878, issued Nov. 16, 2021.
K.J. Wajnikonis, GB2,591,879, issued Nov. 16, 2021.
K.J. Wajnikonis, GB2,591,880, issued Nov. 9, 2021.
K.J. Wajnikonis, S.J. Leverette, AU 2008,211,995 B2, issued Apr. 9, 2009.
K.J. Wajnikonis, S.J. Leverette, AU 2010,238,542 B2, issued Nov. 18, 2010.
K.J. Wajnikonis, S.J. Leverette, U.S. Pat. No. 8,550,171 B2, issued Oct. 8, 2013.
K.J. Wajnikonis, S.J. Leverette, EP 2,042,682 A3, issued Dec. 25, 2013.
K.J. Wajnikonis, S.J. Leverette, U.S. Pat. No. 8,689,882 B2, issued Apr. 8, 2014.
K.J. Wajnikonis, WO 2016/191,637 A1, issued Dec. 1, 2016.
K.J. Wajnikonis, GB2,556,700, issued Feb. 23, 2021.
Merlin Connector make-up; Oil States Industry animation slide set: Screen captures from YouTube video clip entitled "Merlin Connector", 12 pages, 35 slides uploaded on Nov. 18, 2018 by applicant Lrzysztof J. Wajnikonis. Retrieved from Internet by googling: 'Merlin connector YouTube', resulted with the hyperlink: <https://www.youtube.com/watch?v=hwf7sASvpjE>, N/A, Technology 5—30 years old; Screen Captures from YouTube video clip entitled "Merlin Connector" uploaded on Nov. 18, 2018.

* cited by examiner

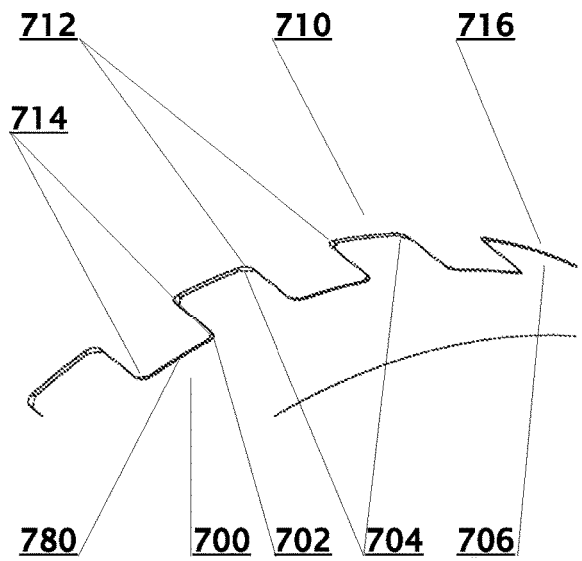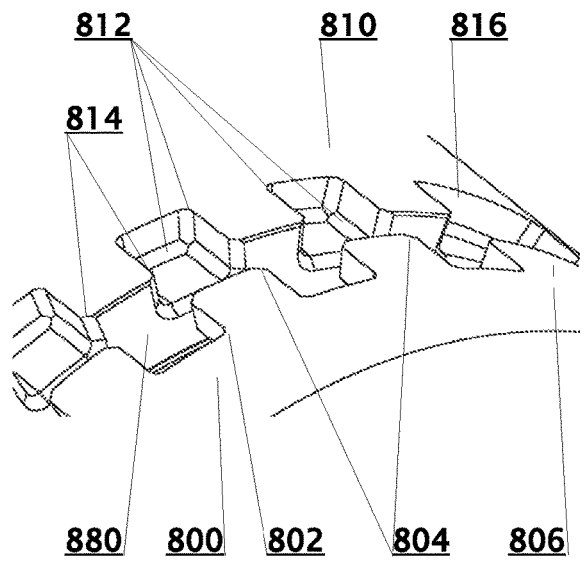
Fig. 7　　　　　　　　　　Fig. 8
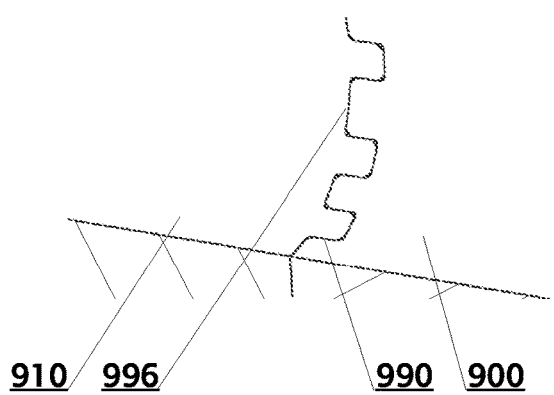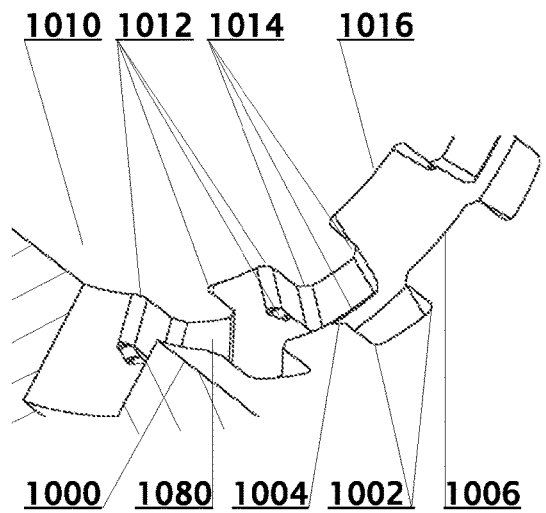
Fig. 9　　　　　　　　　　Fig. 10

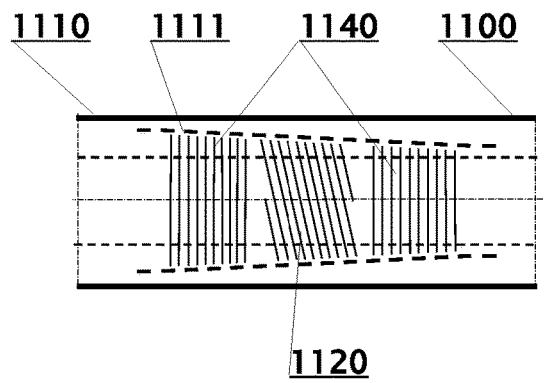
Fig. 11a
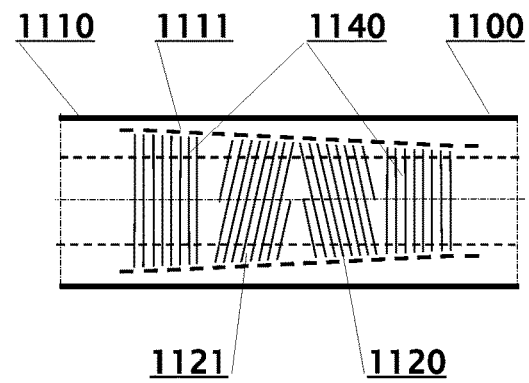
Fig. 11b
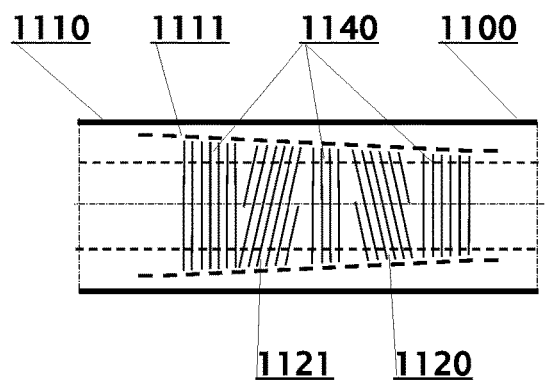
Fig. 11c
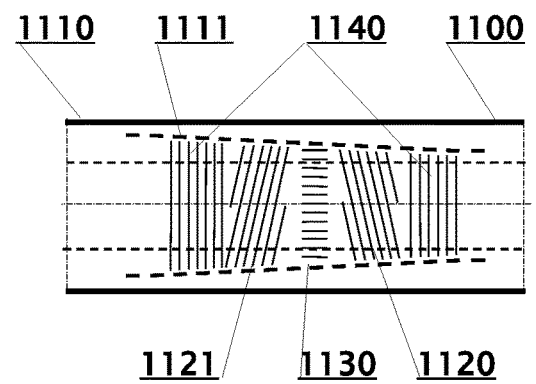
Fig. 11d
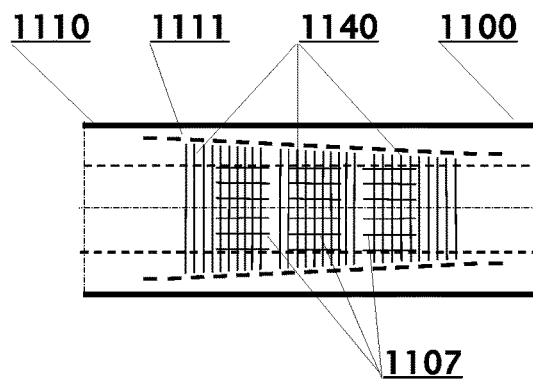
Fig. 11e
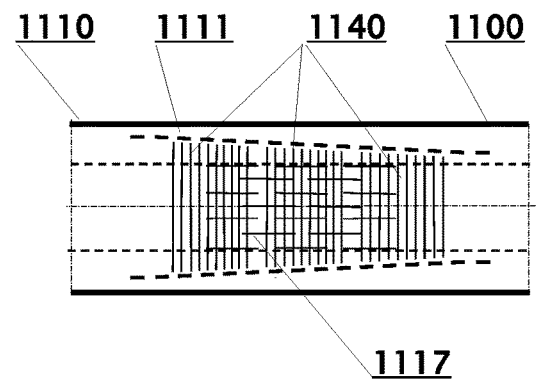
Fig. 11f
Fig. 11

MECHANICAL CONNECTOR OF LONG TORSIONAL AND BENDING FATIGUE LIFE

This application is based on U.S. provisional applications No. 62/148,665 filed on Apr. 16, 2015 and 62/189,437 filed on Jul. 7, 2015. This application as originally filed was identical to parent Patent Convention Treaty Application PCT/US16/28033 filed Apr. 18, 2016. This application claims the benefits of priority related to U.S. provisional applications 62/148,665, 62/189,437 and PCT/US16/28033.

TECHNICAL FIELD

This invention relates to mechanical connectors used in any engineering application, and in particular in offshore engineering at or near the sea surface, above or below the water surface, as well as anywhere in the water column.

BACKGROUND ART

Mechanical connectors of the Merlin™ group (featured for example in GB1,573,945, GB2,033,518, GB2,099,529, GB2,113,335, U.S. Pat. Nos. 5,964,486, 8,056,940, EP0,803,637, etc.) and types derived by third parties from the Merlin™ group of designs are widely used in Offshore Engineering. Merlin™ is a registered name of the most widely used connector in the group that is manufactured by Oil States Industries. Similar connectors acting on the same principle are also manufactured by others, but for simplicity all those designs are referred to herein as Merlin™ group, or Merlin™ family connectors. Those designs and their advantages are well known to anybody skilled in the art.

In particular, the Merlin™ group connectors known characterize with high static and fatigue strengths with regard to axial and bending loads, as required for traditional tendon, conductor, riser, etc. applications. The above traditional connectors do not typically experience high static or fatigue torsional loads and their torsional load capacities are limited to frictional resistance resulting from radial and axial connector preload that could be augmented by the actual loading of the connector. Accordingly the Merlin™ family connectors characterize with limited torsional load capacities that may be difficult to control accurately by design means.

Oil States Industries offers also a high torsional capacity Lynx connector, but that connector is structurally different and it is not designed with particularly high torsional fatigue strength in mind. The Lynx is designed to resist accidental high loads.

Important design considerations pertaining to selecting heights of protrusions and depths of grooves used in the Merlin™ family connectors at various axial locations of those connectors, preferable taper angles at various locations as well as means to improve the telescopic stabbing in operations with the use of hydraulic pressure are disclosed for example in U.S. Pat. No. 8,056,940. Those design features, or their equivalents, can be optionally applied to these designs, wherever applicable.

DISCLOSURE OF INVENTION

This invention builds up on technical features and on the industry experience with the use of Merlin™ family connectors. Novel technical structural features, not used previously in the Merlin™ family or in similar connectors, are provided in order to handle high torsional loads. In addition to friction, structural means utilized in order to transfer high torsional loads include: dog-clutch teeth, fitted pins, keys, splines and interlocked thread systems, all used in isolation or in arbitrary combinations. Static and fatigue bending load capacities of the connectors remain high, while the axial load capacities may or may not be high, depending on the design requirements. Connectors according to this invention can be built as new, carefully optimized designs. In some cases upgrading existing Merlin™ family connector designs to increase their torque transfer capacities may be also feasible.

Merlin family connectors and some of their third party derivatives can be welded to the ends of pipes to be connected, or the pins and the boxes forming the connections can be shaped in the actual pipe used. Typically high yield strength and high quality materials are used for building Merlin-family connectors, and the same or similar characteristics materials should be used for building connectors according to this invention.

Depending on specific design requirements and economic factors (like for example component cost and the size of the market expected) the engineer can select between two subgroups of connectors according to this invention that feature:

Novel connectors adapting Merlin™ family connectors for transferring high torque loads by adding high torque capacity through optimized structural additions;

Novel connectors featuring structural elements that require major design modifications.

The first subgroup includes:

Novel connectors utilizing fitted pins to transfer structurally high torsional loads;

Novel connectors utilizing the dog clutch principle to transfer structurally high torsional loads;

Novel connectors utilizing the shaft-rotor type key systems to transfer structurally high torsional loads.

The second subgroup includes:

Novel connectors utilizing the shaft-rotor spline connection principle to transfer structurally high torsional loads.

Novel connectors utilizing the threaded connection principle to transfer structurally high torsional loads.

Connectors according to this invention that belong to the said first subgroup may involve new designs or they may involve design modifications of known Merlin™ family connectors. The structural additions are introduced in the not very highly loaded regions of known connectors, or in regions where loading pertaining to 'traditional design loads' on Merlin™ family connectors are reduced. Retrofitting spare or retired known connectors with new structural features and torque loading capabilities may be also feasible.

Connectors according to this invention that belong to the said second subgroup require new design.

The axial extents of axisymmetric grooving in the connector, local modifications in the taper angles along the frustoconical interaction surfaces, the heights of the protrusions and the depths of grooving along various segments of the connector assembly are also important and general guidance disclosed in U.S. Pat. No. 8,056,940 should be considered in the design, in a case it may be broadly applicable also to this invention.

This invention involves a mechanical connector, whereas a connection between a pin and a box of said mechanical connector is effected by the principle of zero-pitch angle threads provided on an essentially outside surface of said pin interacting axially and radially by means of axial and radial pretensions with essentially matching zero-pitch angle threads provided on an essentially inside surface of said box; whereas said zero-pitch angle threads provided on said essentially outside surface of said pin and said essentially matching zero-pitch angle threads provided on said essentially inside surface of said box are arranged along a frustoconical pitch diameter surface that is essentially common to said essentially outside surface of said pin and to said essentially inside surface of said box; said mechanical connector being provided with structural means for transferring torque between said pin and said box, whereas said mechanical connector has static and fatigue torsional and bending load capacities controlled by design means and said mechanical connector is also capable of transferring axial loads between said pin and said box of said mechanical connector;

said structural means for transferring torque between said pin and said box including:

a plurality of splines provided on a plurality of essentially matching surface sets of interactions between said pin and said box, including a single essentially matching surface set of interaction between said pin and said box; and also including a plurality of dog-clutch teeth provided on a plurality of essentially matching surface sets of interactions between said pin and said box, including a single essentially matching surface set of interaction between said pin and said box; and also including a plurality of fitted pins, including a single fitted pin, whereas said plurality of said fitted pins is arranged along a plurality of essentially matching surface sets between said pin and set box, including a single essentially matching interaction surface set between said pin and said box, whereas the transfer of said torque is effected by interactions of said pin with said plurality of said fitted pins and at the same time by an interaction of said plurality of said fitted pins with said box; and also including a plurality of keys, including a single key, whereas said plurality of said keys is arranged along a plurality of essentially matching surface sets between said pin and set box, including a single essentially matching surface set between said pin and said box, whereas the transfer of said torque is effected by interactions of said pin with said plurality of said keys and at the same time by an interaction of said plurality of said keys with said box; and also including right handed threads provided on a plurality of essentially matching surface sets of interactions between said pin and said box, including a single essentially matching surface set of interaction between said pin and said box; and also including left handed threads provided on a plurality of essentially matching surface sets of interactions between said pin and said box, including a single essentially matching surface set of interaction between said pin and said box; and also including right handed threads and left handed threads provided on a plurality of essentially matching surface sets of interactions between said pin and said box, including a single essentially matching surface set of interaction between said pin and said box.

BRIEF DESCRIPTION OF DRAWINGS

FIGS. 1 through 13 are provided to facilitate understanding of key features and key implementations of this invention.

FIG. 1 shows an exploded view of a connector according to this invention utilizing spline torque transfer.

FIG. 2 shows a cross-section through one side of a connector according to this invention utilizing spline torque transfer (shown in FIG. 1).

FIG. 3 presents a half view of a connector according to this invention featuring a key torque transfer arrangement.

FIG. 4 shows a detail of a key interacting with a box of a connector according to this invention.

FIG. 5 presents a half view of a connector according to this invention featuring fitted-pin torque transfer arrangements.

FIG. 6 shows details of fitted-pins interacting with pins and boxes of connectors according to this invention, one for each end of the interacting surfaces.

FIG. 7 depicts a detail of an assembled connector according to this invention, whereas the dog-clutch torque transfer principle is utilized near the outside surfaces of the pin and the box. The dog-clutch teeth utilize the full material thickness available between the metal seal region and the outside surface of the connector.

FIG. 8 depicts a detail of a connector according to this invention in an exploded view, whereas the dog-clutch torque transfer principle is utilized near the outside surfaces of the pin and the box. The dog-clutch teeth utilize a part of the material thickness available between the metal seal region and the outside surface of the connector.

FIG. 9 depicts a detail of an assembled connector according to this invention, whereas the dog-clutch torque transfer principle is utilized near the inside surfaces of the pin and the box. The dog-clutch teeth utilize the full material thickness available between the metal seal region and the inside surface of the connector.

FIG. 10 depicts a detail of a connector according to this invention in an exploded view, whereas the dog-clutch torque transfer principle is utilized near the inside surfaces of the pin and the box. The dog-clutch teeth utilize a part of the material thickness available between the metal seal region and the inside surface of the connector.

FIGS. 11*a* through 11*f* depict schematic representations of several types of connectors according to this invention that utilize for structural torque transfer:

the non-zero pitch angle connection principle;

the non-zero pitch angle connection and the spline connection principles;

the shaft-rotor key connection principle.

Figure 12:
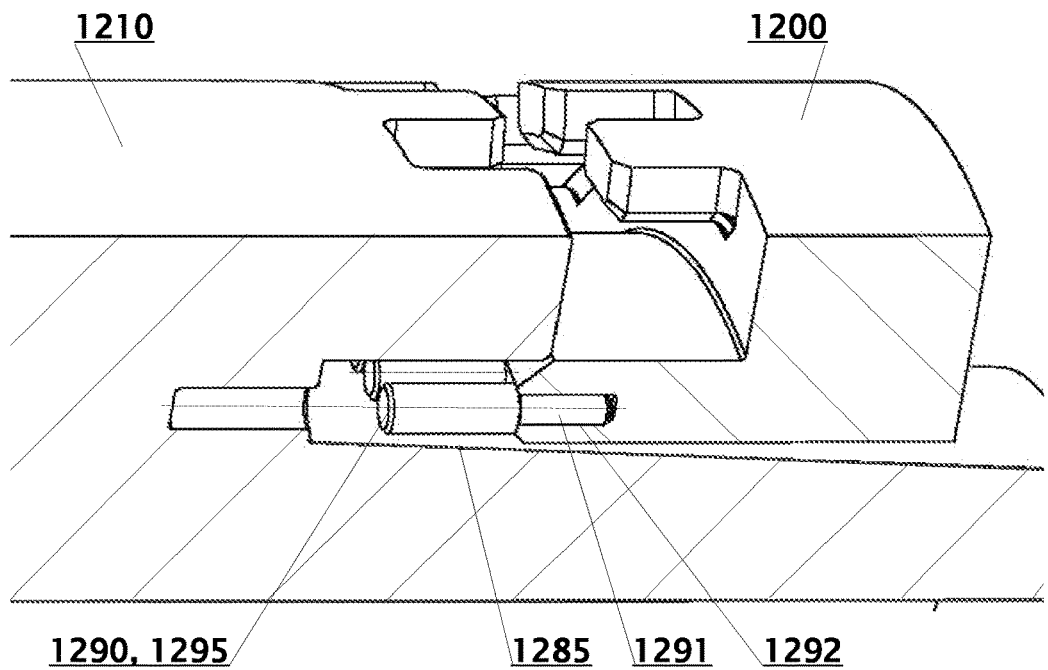

FIG. 12 depicts schematically a segment of a connector according to this invention that combines the dog clutch and the fitted shear pin principles. The high torque capacity region is located near the external metal seals and the torque bearing protrusions extend partly through the wall thickness of the box.

Figure 13:
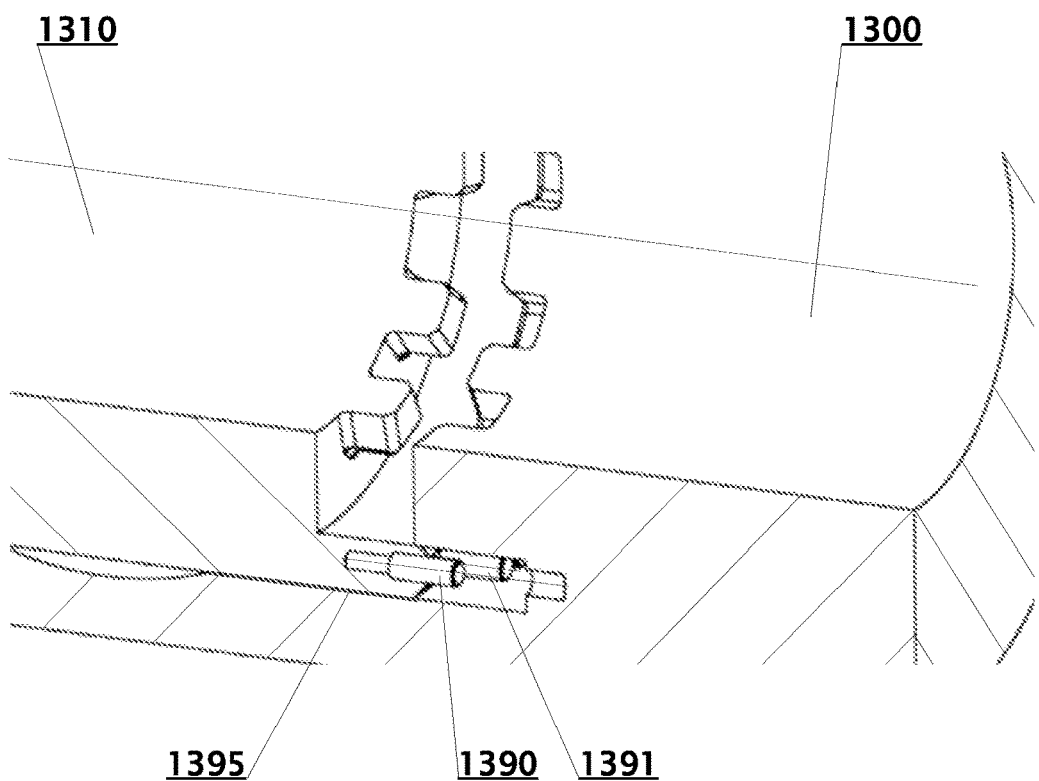

FIG. 13 depicts schematically a segment of a connector according to this invention that combines the dog clutch and the fitted shear pin principles. The high torque capacity region is located near the internal metal seals and the torque bearing protrusions extend partly through the wall thickness of the pin.

MODES OF CARRYING OUT THE INVENTION

The high structural torsional capacities of the connectors according to this invention are achieved by incorporating high capacity torque transfer components in the design of the connectors according to this invention, while the high torsional fatigue life is achieved by optimally shaping and accurately finishing the surfaces of components that transfer high torques between the objects connected. The objects connected can involve pipe segments and/or elements of offshore or onshore structures. The connectors according to this invention incorporate also structural elements typical to the design of the Merlin™ family connectors that provide them with high bending capacities, and wherever required also with high axial load capacities.

Several implementations of this invention are depicted on FIGS. 1 through 13.

Figure 1:
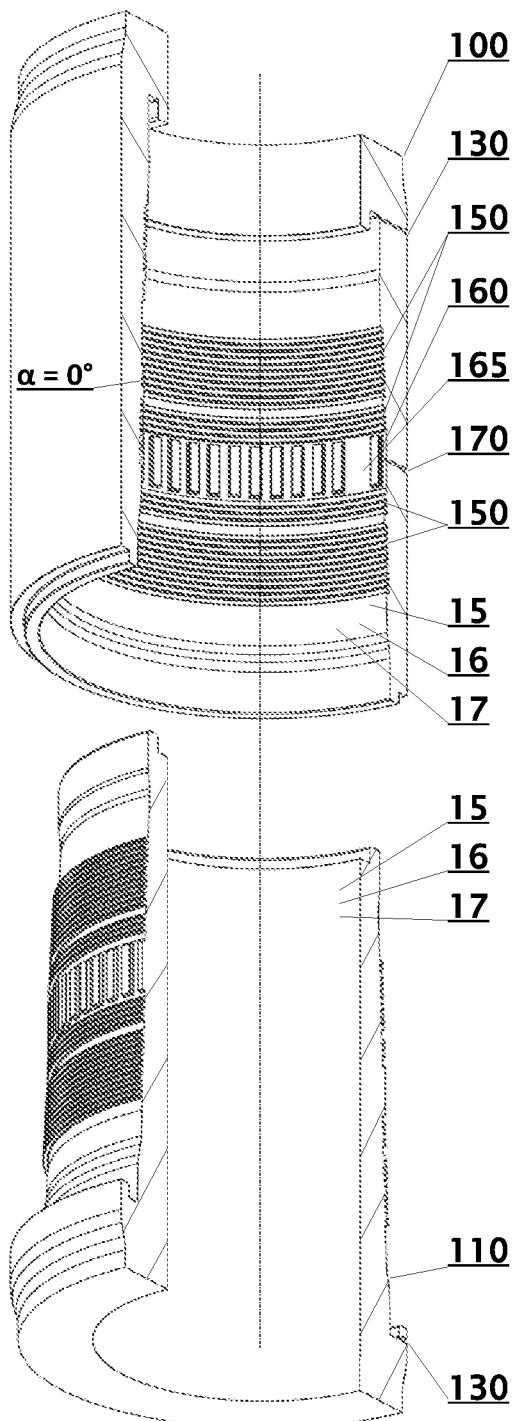

Figures 1and 2 show a connector according to this invention featuring spline torque transfer arrangement 160. FIG. 1 shows an exploded view of box 100 and pin 110, while FIG. 2 shows a cross-section through the same connector assembled.

Figure 2:
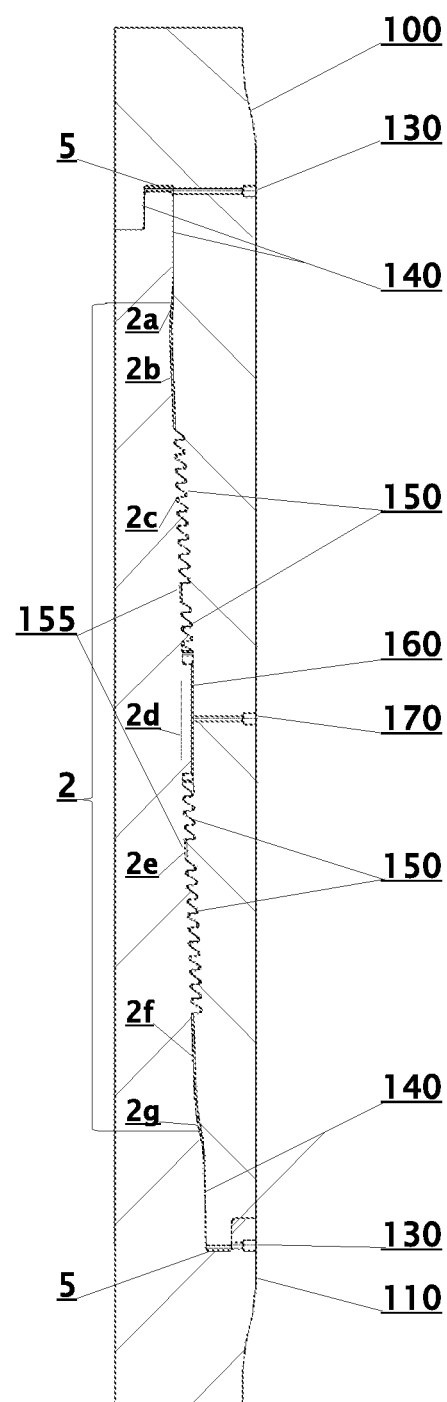
Figure 3:
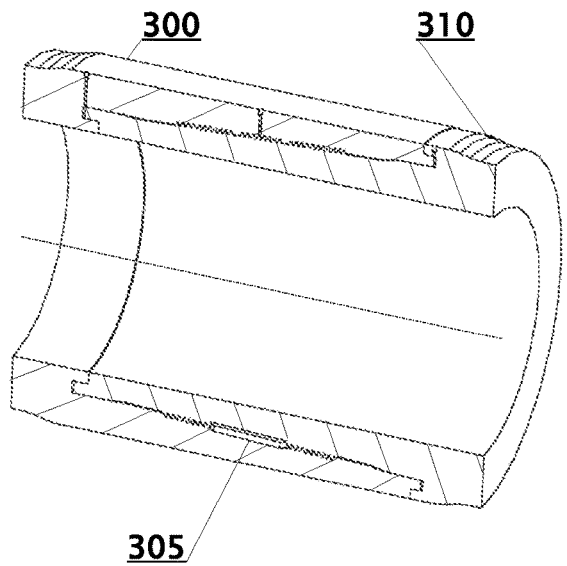
Figure 5:
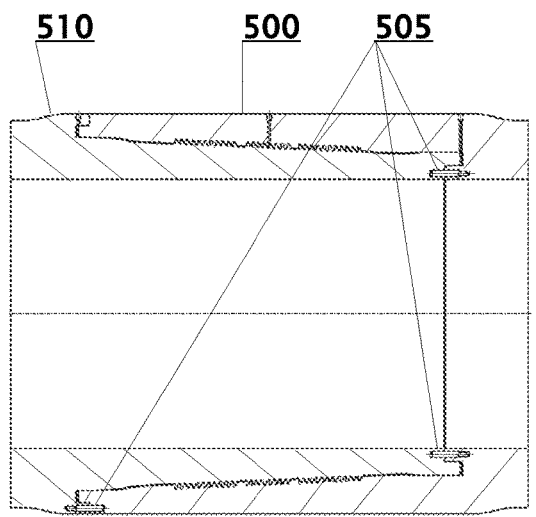

It is noted that spline system 160, 165 as shown in FIGS. 1 and 2 can be also incorporated in FIG. 3, FIG. 5, it can be combined with any of FIGS. 7 through 10 or with FIGS. 11a through 11c, 11e, 11f, 12 or/and 13 similarly to the arrangement depicted for a sake of an example on FIG. 11d. All the above highlighted combinations represent feasible designs of connectors according to this invention.

In addition to spline torque transfer arrangement 160 this connector implements typical Merlin™ family features that are well known to those skilled in the art. The assembly and disassembly of all connectors according to this invention are briefly outlined here by reference to FIGS. 1 and 2.

Connectors according to this invention can be assembled either simply by telescopic stabbing in, or they may need to be assembled with the aid of hydraulic pressure contracting the pin and expanding the box, which is a principle well known to those skilled in the art. That is carried out similarly to the corresponding operational procedures relevant to the Merlin™ family connectors and some of their derivatives. The assembly/disassembly of connectors according to this invention is reversible, i.e. they can be disassembled using hydraulic pressure and reassembled again. The assembly and the disassembly can be carried out above or below the water surface.

Important design considerations pertaining to selecting heights of protrusions and depths of grooves used in the Merlin family connectors at various axial locations of those connectors, as well, preferable taper angles at various locations as well as means to improve the telescopic operations with the use of hydraulic pressure are disclosed for example in U.S. Pat. No. 8,056,940 and those in general apply to implementations of this invention described herein. Those design features, or their equivalents, can be optionally applied to these designs, where applicable.

Identically to the known Merlin™ family connectors, each novel mechanical connector is provided with a zero pitch angle, axisymmetric thread located on substantially overlying, substantially matching, substantially frustoconical surfaces 2 extending essentially between two sets of metal (nipple) seals 140. One of said sets of metal (nipple) seals 140 is located near an end of box 110 and the other said set of metal (nipple) seals 140 is located near an end of pin 100. It is known to anybody skilled in the art that each of said sets of metal (nipple) seals 140 incorporates substantially cylindrical surfaces with an outside substantially cylindrical surface and an inside substantially cylindrical surface of a male substantially cylindrical segment interacting radially with substantially matching substantially cylindrical surfaces of an annulus of a substantially cylindrical cavity 5. Said substantially matching substantially frustoconical surfaces 2 have in general variable taper angles of lines 2a, 2b, 2c, 2d, 2e, 2f and 2g shown on FIG. 2. Lines 2a, 2b, 2c, 2d, 2e, 2f and 2g extend along segments of said substantially matching, substantially overlying substantially frustoconical surfaces 2, as shown. In particular line 2d shown along a segment of splines 160 features a zero taper angle for axisymmetric threads along lines 2c or 2e. Metal to metal seals 140 are used to seal a cavity between box 100 and pin 110 that is filled with a hydraulic fluid at the stage when the connector is only initially assembled. Metal to metal seals 140 seal the said cavity, while the fluid is delivered through port 170. Hydraulic pressure expands box 100 and 'contracts' pin 110 in the radial direction through the mechanism of meridional bending. That enables the final assembly stroke in the axial direction that makes up the connection by engaging zero-pitch angle threads 150, 155 of box 100 and pin 110. Axisymmetric, zero-pitch angle grooves (threads) 150, 155 can engage only in the correct axial position due to the use of non-uniform axial pitch of thread 155. Axisymmetric, zero-pitch angle thread 150, 155 is responsible for the transfer of axial and bending loads as well as for the axial and radial pre-stressing of the connector. Excess hydraulic fluid is removed through fluid outlet ports 130 near each end of the connector.

High torsional and bending load capacity connectors according to this invention optionally, but quite often require precisely accurate azimuth angle orientations of box 100 relative pin 110. The azimuth orientation angles of box 100 relative pin 110 are modified by rotating pin 110 relative box 100 around the axis of the connector. In a case the azimuth assembly angle is specified, spline system 160, 165 used has non-uniform pitch of teeth 165 in the circumferential direction due to the use of non-uniform pitch of trough 165 (and of the matching spline tooth, not visible) in the circumferential direction, so that the connector according to this invention can be assembled in only the prescribed design azimuth orientation. That is most often the case.

In the connector shown in FIGS. 1 and 2 spline system 160, 165 is arranged on cylindrical segments of box 100 and pin 110, which is optional and preferable, but splines can also be shaped along tapered surfaces, essentially matching the average local taper angles of the contact surfaces of box 100 and pin 110.

Similarly to splines used in machine engineering, splines 160 and 165 can be parallel-sided, they can have involute shaped sides, they can have triangularly shaped spline teeth, they can have straight teeth interacting with involute shaped teeth, etc., as required. If necessary radial and circumferential pre-loads can be used by utilizing a required degree of interference fitting between spline teeth 160, 165 of box 100 and pin 110. The latter is often the case depending on the design requirements, as it typically is in Merlin™ family connectors with regard to the axial and radial pre-loading. Spline teeth 160, 165 of the connector shown in FIGS. 1 and 2 are parallel-sided as an example only.

Design features typically used for assembling the connectors shown in FIGS. 1 through 11 are deliberately omitted from the drawings for simplicity. Annotations 15, 16 and 17 on FIG. 1 indicate options to use lining 15, cladding 16 and/or welding overlay. Those can be used on any surface of any novel connector shown on FIGS. 1 through 13.

FIG. 3 presents a half view of a connector according to this invention featuring key 305 torque transfer arrangement. For simplicity only box 300 and pin 310 are annotated, the remaining design features shown are analogous to those already explained.

Figure 4:
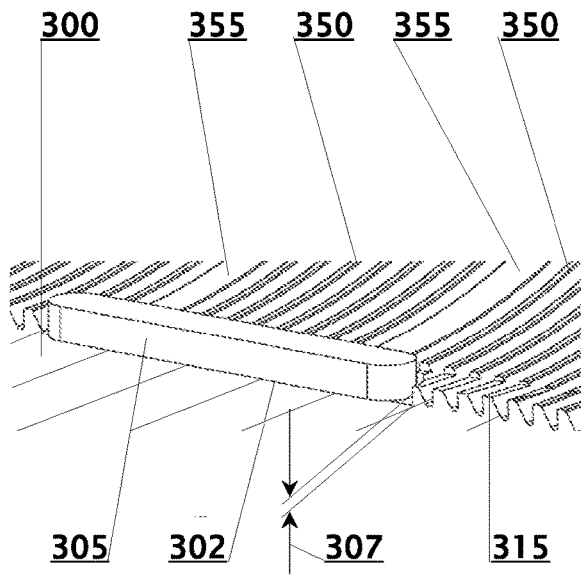

FIG. 4 shows a detail of key 305 interacting with box 300 of the connector in FIG. 3. Key 305 shown in FIGS. 3 and 4 is sunk in pin 310. Gap 307 is shown between outside face 302 of key 305 and the depth of the key groove provided in box 300. Axisymmetric, zero-pitch angle thread is designated with 350 and 355; 355 is pertaining to non-uniform axial pitch grooving. The longitudinal axis of key 305 shown is parallel to the average taper of the interacting surfaces of box 300 and pin 310 along the length of the key, which is preferred, but that does not need be the case in other designs.

The shape of outside face 302 of key 305 is impossible to see in the figures, but for the sake of an example it is shown flat. In order to allow for some bending rigidity of key 305 during the final stage of the assembly, while box 300 and pin 310 flex in meridional bending because of a pressurization, groove 315 can be optionally provided. Groove 315 may not be required in cases when outside face 302 of key 305 is rounded to match the outside major diameters of the axisymmetric grooving of pin 310 (not shown in FIG. 4 and not annotated on FIG. 3). Rounding outside face 302 of key 305 is preferable, either to match the outside contour of major diameters of the axisymmetric pin grooving, or equal to the minimum value of the major diameter of the axisymmetric pin grooving along the length of key 305, so that the outside corners of key 305 (sides of outside face 302) never protrude outside of the contour of the adjacent grooving of pin 310. Key 305 is best interference fitted into its channel in pin 310, and preferably also (preferably loosely) bolted to pin 310 (optional screw not shown) or otherwise secured, in order to avoid a possibility of jamming during a disassembly or assembly of the connector. The sides of key 305 are preferably also interference fitted into the key channel in box 300.

In FIGS. 3 and 4 key 305 shown is double-rounded, but that is for the sake of an example only. Practically all types of key connections used in machine engineering can be used with connectors according to this invention. Those include feather keys, square keys, flat keys, beveled keys, Woodruff keys, taper keys, etc.

The key inserts can be alternatively provided with circular, oval, elliptical, or other curvilinear cross-sections. It is noted, however, that more machine-connection-like key cross section shapes, like square or rectangular cross sections with only slightly rounded edges have higher bearing load capacities than have those provided by keys having circular or elliptical cross sections.

Depending on the torque capacity of the connector required for a particular design, multiple keys can be arranged around the circumference of the connector (multiple o'clock positions), which is preferably the case. Those keys can be arranged in one circumferential row, like in case of FIG. 3, with additional keys not visible, or in several rows (see schematic illustration in FIG. 11e), in staggered rows or in irregular arrangements (see schematic illustration in FIG. 11f). It is noted that key system 305 as shown on FIG. 4 can be also incorporated in the design shown on FIG. 5, they can be combined with any of FIGS. 7 through 10, with any of FIGS. 11a through 11d, 12 or/and 13. All the above highlighted combinations represent feasible designs of connectors according to this invention.

In a case of an 'off a shelf', or retrofitted Merlin™ family connector being adapted to carry high torsional loads, it may be acceptable to sacrifice some of the original axial and even bending capacity of the connector in order to upgrade its torsional load capacity by adding systems of keys 305.

If required, keys 305 are typically arranged around the circumference in a non-uniform circumferential pitch or/and pattern, in order to assure the connector assembly with the prescribed azimuth orientation of box 300 relative pin 310.

FIG. 5 presents a half view of a connector according to this invention featuring fitted-pin 505 torque transfer arrangements. Multiple fitted pins 505 can be arranged around the circumference of the connector in the region of one of the connector ends or simultaneously in regions of both ends as it is shown on FIG. 5. The use of fitted pins 505 simultaneously at both connector ends is preferable, because that limits frictional load differential between the interaction surfaces of box 500 and pin 510. Fitted pins 505 can be arranged in a single row at each end, or in multiple rows that may or may not be staggered with regard to each other in the radial and/or circumferential direction(s). Only one row of fitted pins 505 is shown near each end in FIG. 5, for the sake of an example. If required, fitted pins 505 are typically arranged with a non-uniform circumferential pitch or pattern in order to assure the connector assembly with the correct azimuth orientation of box 500 relative pin 510.

Figure 6:
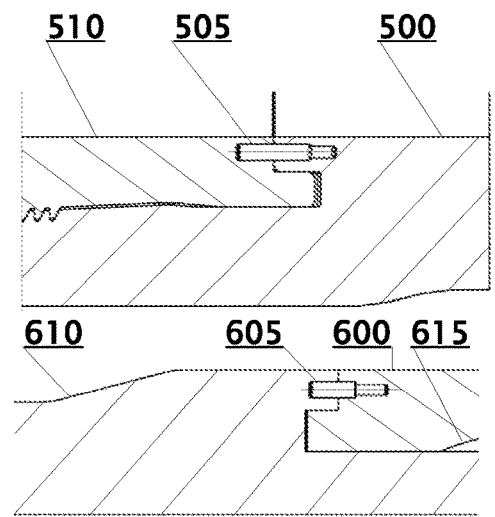

FIG. 6 shows details of fitted-pins 505, 605 interacting with pins 510, 610 and with boxes 500, 600 according to this invention, one for each end of the interacting surfaces. The top detail depicted in FIG. 6 is that of the connector shown in FIG. 5; see the bottom right corner of FIG. 5. The bottom detail in FIG. 6 is that of another similar connector, note the differing dimensional proportions of box 600, pin 610 and fitted pin 605. In particular note circumferential groove 615 in the box that is used in order to increase locally the meridional flexibility of box 600.

Similar grooves or systems of multiple grooves increasing locally the structural flexibility can be arranged in corresponding locations or in other regions of boxes and/or pins, in particular in the regions adjacent to metal seals. Depending on particular design requirements those may be beneficial in any connector depicted on FIGS. 1 through 11f or otherwise discussed herein.

Connectors featuring fitted pins 505, 605 can be economical in design, retrofitted with fitted pins or otherwise adapted for particular design requirements, because fitted pins 505, 605 or alike can be easily located in regions of relatively low structural loading. Holes to fit fitted pins 505, 605 are relatively easy to drill and shim to whatever geometries may be required. Typically interference fitting of fitted pins 505, 605 or alike may be required depending on particular design needs.

Fitted pins 505, 605 can be optionally screwed into one of the parts being connected or/and bonded with an adhesive. O-rings, metal ring seals or other sealing arrangements can be used in order to protect fitted pins 505, 605 from seawater and from internal fluids, as applicable. Corrosion Resistant Alloys (CRAs), titanium alloys, aluminum alloys, magnesium alloys, other materials, cladding with CRAs, weld overlaying with CRAs or encapsulating of interacting regions in protective resins, etc. can be used with novel connectors according to this invention. It is noted that fitted pins 505, 605 as shown on FIG. 6 can be also incorporated in the designs shown on FIGS. 1 through 3, or they can be combined with any of FIGS. 7 through 10 or with any of FIGS. 11a through 11f. All the above highlighted combinations represent feasible designs of connectors according to this invention.

FIG. 7 depicts a detail of an assembled connector according to this invention. The dog-clutch torque transfer principle is utilized near the outside surfaces of pin 710 and box 700. Dog-clutch teeth 780, 706, 716 utilize the full material thickness available between the metal seal region and the outside surface of the connector, which is not fully visible on the figure.

If required, dog-clutch teeth 780, 706, 716 are typically arranged around the circumference in a non-uniform circumferential pitch or/and pattern, in order to assure the connector assembly with the correct azimuth orientation of box 700 relative pin 710. Teeth 706/716 have for that purpose different circumferential pitch than teeth 780 have.

FIG. 8 depicts in an exploded view a detail of a connector according to this invention. The dog-clutch torque transfer principle is utilized near the outside surfaces of pin 810 and box 800. Dog-clutch teeth 880, 806, 816 utilize a partial material thickness available between the metal seal region and the outside surface of the connector.

It is known to anybody skilled in the art that long life torsional fatigue strength of circular cross-section components (like for example turbine shafts) is less sensitive to the working cross-section changes than bending fatigue is. However, for this application high torsional fatigue strength is important and the preferred designs utilize relatively large fillet radii 702, 802 and 712, 812 for the concave regions of component edges. In particular large fillet radii 702, 802 are used on FIGS. 7 and 8 for box 700, 800 concave edge regions and large fillet radii 712, 812 are used for pin 710, 810 concave edge regions. For convex edge regions the shapes are not critical for fatigue life and chamfers 704, 804 are shown for the convex edge regions of boxes and 714, 814 for the convex edge regions of pins, but fillets can be also used instead. High torsional load capacity arrangements 780, 880, 706, 806, 716, 816 shown feature non-uniform circumferential pitch of shapes 706, 806 and 716, 816 on boxes 700, 800 and pins 710, 810 respectively, in order to assure that the connector can only be assembled in its prescribed azimuth orientation of pins 710, 810 relative boxes 700, 800, respectively.

FIG. 9 depicts a detail of an assembled connector according to this invention. The dog-clutch torque transfer principle is utilized near the inside surfaces of pin 910 and box 900. Dog-clutch teeth 990, 996 utilize the full material thickness available between the metal seal region and the inside surface of the connector, which is not fully visible on the figure.

If required, dog-clutch teeth 990, 996 are typically arranged around the circumference in a non-uniform circumferential pitch or/and pattern, in order to assure the connector assembly with the prescribed azimuth orientation of box 900 relative pin 910. Teeth 996 have for that purpose different circumferential pitch than teeth 990 have.

FIG. 10 depicts in an exploded view a detail of a connector according to this invention. The dog-clutch torque transfer principle is utilized near the inside surfaces of pin 1010 and box 1000. Dog-clutch teeth 1080, 1006, 1016 utilize a partial material thickness available between the metal seal region and the inside surface of the connector.

If required, dog-clutch teeth 1080, 1006, 1016 are typically arranged around the circumference in a non-uniform circumferential pitch or/and pattern, in order to assure the connector assembly with the prescribed azimuth orientation of box 1000 relative pin 1010. Teeth 1006/1016 have for that purpose different circumferential pitch than teeth 1080 have.

For this application high torsional fatigue strength is important and the preferred designs utilize relatively large fillet radii 1002 and 1012 for concave regions of component edges. In particular large fillet radii 1002 are used for box 1000 concave edge regions and large fillet radii 1012 are used for pin 1010 concave edge regions. For convex edge regions the shapes are not critical for torsional strength and chamfers 1004 are shown for the convex edge regions of box 1000 and 1014 for the convex regions of edges of pin 1010, but fillets can be also used instead.

The design of the protruding teeth and matching hollows carrying torsional loads can be reversed between the boxes and the pins without affecting the functionality of this invention in the examples shown on FIGS. 7 through 10. A mixed reversed/not reversed design can also be used instead of that shown.

Connectors featuring the dog-clutch torque transfer arrangements can be economical in design for particular requirements, because torque transfer teeth 780, 706, 716, 880, 806, 816, 990, 996, 1006, 1016 can be easily located in regions of relatively low structural loading as shown in FIGS. 7 through 10. Dog-clutch teeth arrangements like those shown in details on FIGS. 7 through 10 can be also incorporated for example in any of the designs shown on FIGS. 11*a* through 11*f*. All the above highlighted combinations represent feasible designs of connectors according to this invention.

Whenever the torque transfer arrangements are located simultaneously on both ends (near both metal seal systems) in the same connector, connectors according to this invention utilizing fitted pins 505, 605 or dog-clutch torque transferring teeth 780, 706, 716, 880, 806, 816, 990, 996, 1006, 1016 characterize with most of the torque being transferred through the connector structures, while largely by-passing those main contact surfaces between the boxes and the pins that transfer the axial and bending loads.

FIGS. 11*a* through 11*f* depict schematic representations of several types of connectors according to this invention designed for structural torque transfer.

Example implementations of mechanical connector according to this invention shown in FIGS. 11*a* through 11*f* provide differing load transfer functions between box 1100 and pin 1110 are separated longitudinally into segments. Surfaces 1111 of frustoconical pitch diameters (averaged diameter) are depicted schematically with dashed lines. Groove/protrusions systems (also referred to herein as grooving) along surfaces 1111 are shown schematically with groups of thin continuous lines. In general the taper angles of the frustoconical surfaces of box 1100 and pin 1110 vary along the lengths of the connectors. The same is in general the case with other connectors like those shown on FIGS. 1 through 10.

Because generic families of connectors are represented only schematically on FIG. 11, the same generic annotations are used for simplicity on FIGS. 11*a* through 11*f* for all the generic components corresponding in connectors of differing designs:

Known types of grooving (thread) providing static and fatigue transfer of axial and bending loads are annotated 1140 (axisymmetric, zero pitch angle);

Grooving (thread) featuring absolute values of pitch angles (fixed or variable) greater than 0° and smaller than 90° according to this invention are annotated 1120 and 1121 for left handed and right handed threads respectively; Grooving 1120 and grooving 1121 combine the functions of transfer of axial, bending and torsional static and dynamic (fatigue) loads;

Spline-type grooving according to this invention that transfers torsional static and dynamic loads is annotated 1130 (absolute value pitch angles equal to or close to 90°).

Systems of keys used for torque transfer annotated 1107 for keys arranged in circumferential rows and 1117 for axially staggered key patterns, or for keys distributed irregularly on surfaces 1111.

The numbers of segment types shown in any schematic view included on FIGS. 11*a* through 11*f* and their relative axial arrangements are incidental and these values/features can be modified arbitrarily without changing the type of implementation of this invention.

FIG. 11a depicts an example implementation of this invention featuring two segments with grooving type 1140 and one segment with grooving type 1120. The example shown in FIG. 11a equally represents its mirror image with a replacement of grooving type 1120 with grooving type 1121.

FIG. 11b depicts an example implementation of this invention featuring two segments with grooving type 1140 and two non-zero pitch angle segments with thread types 1120 and 1121. Segment 1120 utilizes left-handed thread and segment 1121 utilizes right-handed thread.

FIG. 11c depicts an example implementation of this invention featuring several segments with grooving type 1140, a segment according to this invention with thread type 1120 and a segment according to this invention with thread type 1121. Segment 1120 utilizes left-handed thread and segment 1121 utilizes right-handed thread.

FIG. 11d depicts an example implementation of this invention featuring two segments with grooving type 1140, one segment with spline grooving type 1130, a segment with thread type 1120 and a segment with thread type 1121. It is understood that similar systems utilizing multiple spline sets (segments) 1130 can also be used in connectors featuring also segments type 1120 and/or 1121, or in connectors utilizing only segments type 1140 and sets type 1130, see FIGS. 1 and 2 for the simplest example.

FIGS. 11e and 11f depict example implementations of this invention featuring known type of axisymmetric, zero-pitch angle grooving 1140 that is utilized to transfer axial and bending loads between box 1100 and pin 1110 with key inserts 1107, 1117 essentially following local taper angles of the pitch diameter surfaces 1111 of box 1100 and pin 1110. Any geometrical shapes and types of key inserts 1107, 1117 can be used. It is noted however, that the key-grooves and the key-inserts need not necessarily follow the local taper angles in many similar connectors according to this invention. They may or may not be arranged essentially in straight lines and in addition to being arranged essentially in axial (meridional) planes, they can also be arranged at non-zero angles to the said axial (meridional) planes of the said connector according to this invention.

Although that does not necessarily need to be the case, it is preferred that key inserts have as slim design as possible, in particular in the radial direction of the connector. If feasible, the grooving used to insert the keys utilized in this invention should preferably not penetrate inside the material of box 1100 or pin 1110 deeper than grooving type 1140, or/and types 1120 or/and 1121 if also used in the same connector (see also FIGS. 3 and 4).'

However, in particular where the length of the said connector is the issue, or when the axially symmetrical grooving is very shallow, deeper grooving than that outlined above may need to be used with key grooving 1107, 1117 utilized in the said connectors according to this invention. Shallow grooving 1107, 1117 may weaken bending load capacities of connectors only minimally.

Non-zero pitch thread segments 1120, 1121, while used separately would only allow a reliable torque transfer in one rotational direction, that which tightens the tapered thread. Applying a torque in an opposite direction would have unscrewed the connection. Both these facts are well known to those skilled in the art, because they are widely used in threaded connections, including for example tapered threaded drill-pipe connectors. However, in connectors according to this invention the unscrewing of either thread 1120 or 1121 is prevented because of the interlocking with other types of grooving 1140, 1121 or 1120, respectively and connectors according to this invention like for example those shown on FIGS. 11a through 11d are very effective in the transfer of torsional loads in both opposite rotational directions. In connectors according to this invention with only one thread direction 1120 (see FIG. 11a) or 1121 (example not shown) the unscrewing is prevented by interlocking (via an axial load) on axisymmetric grooving 1140. On connectors that utilize non-zero pitch angle thread 1120 and 1121 (FIGS. 11b, 11c and 11d) thread 1120 is torsionally interlocked against the opposite thread, with grooving 1140 and in the case of the system shown in FIG. 11d spline set (system) 1130 helping additionally.

Pitch angles of thread 1120 and/or 1121 should be selected carefully in the design. Large, close to 90° absolute values of those pitch angles are more effective in the transfer of torque and less effective in the transfer of the axial and bending loads, vice versa for small pitch angles approaching 0°.

FIG. 12 depicts schematically a segment of a connector according to this invention that combines the dog clutch and the fitted shear pin principles. The high torque capacity region is located near the external metal seals 1285 and the torque bearing protrusions extend partly through the wall thickness of box 1200 and they match cavities in pin 1210.

Pins 1290 or 1295 are tight fitted in cavities of box 1200 and pin 1210. Pins 1290 can have uniform cylindrical shape (not shown) or pins 1295 can be of a slightly tapered shape (not shown) that would not be visible on the drawing, if shown. Optionally, stepped fitted pin design 1291 can be used in various implementations of this invention, as shown on FIG. 12. Optionally pin 1291 and the box region where it is inserted can be threaded, as shown with annotation 1292. In a case the stepped fitted shear pin shape is selected, the stepped pin nest, threaded or not threaded, can be located in pin 1210, or it can be located instead in the box 1200 part of the connector, if preferred so, without affecting the functionality of this invention.

FIG. 13 depicts schematically a segment of a connector between box 1300 and pin 1310 according to this invention that combines optionally the dog clutch and the fitted shear pin principles. The high torque capacity region is located near internal metal seals 1395 and the torque bearing protrusions extend partly through the wall thickness of box 1300. Fitted shear pins are depicted in fully inserted and partly inserted positions 1390 and 1391, respectively. Remarks already provided with the descriptions of other drawings also apply to FIG. 13.

Connectors according to this invention that utilize fitted pin 505, 605 systems, dog-clutch torque transferring teeth 780, 706, 716, 990, 906, 916 and key arrangements 305, 1107, 1117 can be newly designed, or they can be alternatively designed by retrofitting or adapting known Merlin™ family connectors for upgrades of their torsional capacities and thus becoming connectors according to this invention. The above connectors belong to the said first subgroup of connectors according to this invention. Those designs are shown for example on FIGS. 3 through 10 and 11e, 11f, 12 and 13.

Connectors according to this invention that utilize spline systems (sets) 160, 165, 1130 as well as left or right handed non-zero pitch angle threads 1120, 1121 belong to the said second subgroup of the connectors according to this invention, which in each case requires new designs. Those connectors are depicted for example on FIGS. 1, 2, and 11a through 11d.

Newly designed connector elements should be dimensioned for specific design requirements. In particular many connectors according to this invention require high static and fatigue torsional and bending capacities of the same order, while for example their design axial load capacities may be a great deal smaller than are those typical of the applications of the Merlin™ family connectors. In such cases connectors according to this invention may require smaller numbers of axisymmetric, zero-pitch angle grooves similar to those shown herein as 160, 165, 350, 355, 1140, and the teeth profiles used may be 'slimmer'. Their design may turn up to be more compact than are typically those used in Merlin™ family connectors used on a pipe of the same size. Stress analyses, design testing required, etc. are similar to those typically used in designing and qualifying known Merlin™ family connectors, with torsional load related considerations added. The teeth designed to carry predominantly torsional loads or predominantly bending have more symmetrical profiles than are those that carry axial, bending and axial pre-stressing loads, because typical loadcases of connectors according to this invention may involve reversible torsional loads (i.e. clockwise and anti-clockwise) and reversible bending loads (i.e. left and right in plane, and left and right out-of-plane) of say an adjacent elbow, while negative and positive load amplitudes are often similar.

In many implementations of this invention it is recommended to use a carefully selected torsional preload of interacting surfaces, which in particular can be achieved by means of radial preload which results in a desired circumferential fit between the surfaces interacting. The use of a suitable torsional preload is preferable for similar reasons as are those with regard to the axial and bending loading of traditional Merlin™ family connectors, which is obvious to anybody skilled in the art. For the same reason, whenever a close to 90° pitch angle grooving is used, or splines are used, providing such connectors with optional external ribs that would stiffen the connector in meridional bending might be considered in the design optimization. Increasing meridional bending stiffness of a connector by means of meridional ribs hardly affects its bulk torsional flexibility. For the same reason splines may be often preferred to high pitch angle threads 1120, 1121.

It is noted that the description and figures included herein do not limit the design range of the connectors according to this invention to only those solutions depicted on drawings and/or discussed explicitly. The discussion and figures included herein characterize whole classes and families of connectors according to this invention with only some specific representations shown as outline examples characterizing broader classes of connectors according to this invention.

For example connectors according to this invention utilizing fitted pins similar to 505, 605, or many other shapes of fitted pins used in mechanical engineering (including those having for example square or hexagonal cross-sections) that are suitable for torque transfer according to this invention, can be also used to transfer torsional loads between boxes 500, 600 and pins 510, 610 while being arranged between other box and pin surfaces, not shown on FIGS. 5 and 6. For example, some designs of connectors according to this invention may be suitable for placing fitted pin rows in the cavities of the metal seals, like those shown as 140, at the end of a box, at the end of a pin or in both those locations, see FIGS. 12 and 13. Fitted pins can also be used between dog-clutch teeth 780, 706, 716, 990, 906, 916. All such families of connectors feasible are hereby regarded as connectors according to this invention. Connectors featuring other grooving patterns than are those shown on FIG. 11a through 11f or on other figures herein are also regarded as connectors according to this invention, providing that those patterns of connectors according to this invention utilize the components identified herein.

Similarly, dog-clutch principle teeth can also be arranged at the ends of metal seals, like those shown as 140, again at either one or at both connector ends.

Connectors according to this invention can be welded to the ends of pipes to be connected, or the pins and the boxes forming a connector can be shaped in the actual pipe material used. Typically high yield strength and small grain high quality materials are used for manufacturing of connectors according to this invention. Components of connectors according to this invention can be built from materials compatible with sweet or sour service requirements; they can be clad or lined, etc., as the design needs require. Those include boxes and/or pins and/or other components used in the same connector being made of different materials. Boxes and/or pins and or/other components used in the same connector can utilize or not utilize weld overlay(s), lining and/or cladding as required. CRAs, titanium alloys, aluminum alloys, magnesium alloys and other metallic alloys can be used depending on the design needs. Conventional or novel welding techniques, like for example friction welding can be used. Conventional or new manufacturing technologies, like for example 3-dimensional (3-D) printing, can be used for building the connectors according to this invention.

During the design multiple considerations should be taken into account, in order to provide the said connector according to this invention with high fatigue strength. In particular the accuracy of finish of the surfaces of the connector is important for pre-stressing and for high fatigue load applications. It is recommended in particular that the connector according to this invention be built to high degree of accuracy and very smooth surface finish. It is recommended to consider carrying out shot peening, laser peening or equivalent during the manufacturing operations. High accuracy grinding and polishing should also be used, or at least considered. Benefits of thermal treatment should also be utilized where applicable, including surface thermal treatment, nitriding, etc.

In cases of crisp separations between the axial-bending and torsional load capacity areas (for example for dog-clutch, key and spline designs) mechanical connectors according to this invention need to be designed against accidental locking in a similar way to that, which is used in Merlin™ family connectors and/or its third party derivations, see for example U.S. Pat. No. 8,056,940.

Whenever a connector according to this invention has to be assembled at a specific relative azimuth angle orientation of a pin versus a box, it is optionally recommended that external markings are provided to facilitate the assembly with that correct azimuth angle. An optional assembly guide system can be provided and it can be designed in varieties of ways. It can be removable, or it can be left permanently on the connector in use, etc.

Subject to specific design requirements for specific connectors the above recommendations normally apply to most connectors according to this invention.

INDUSTRIAL APPLICABILITY

Known Merlin™ family connectors are used primarily for connecting tendon and rigid riser, including Steel Catenary Riser (SCR) joints. In those applications tension and bending loads are high, while torsional loads are very small. Use of Merlin™ family connectors have been at least suggested for rigid jumper joints, however such a use would be limited to those jumper connections that do not see very high torsional loads.

Connectors according to this invention are suitable for use in rigid jumpers subject to very high static and fatigue torsional and bending loads. For example complicated three dimensional rigid jumpers are often used in ultra deepwater.

Simple shaped inverted 'U' or 'M-shaped' rigid jumpers are often used to connect subsea wellheads with Pipeline End Terminations (PLETs) or Pipeline End Manifolds (PLEMs). Those are fitted at ends of subsea pipelines that expand thermally in their longitudinal directions. PLETs and PLEMS slide on their mudmats imposing torsional loads on the vertical segments of the jumpers and connectors and bending loads on the remaining segments of those jumpers. Whenever the jumpers are short, high torsional loads must be resisted by the connectors. Connectors according to this invention are more suitable for the use with inverted 'U' and 'M-shaped' rigid jumpers than are known Merlin™ family connectors, and they are more economical to use than collet connectors are.

Another class of examples of suitable use of connectors according to this invention are those required for connecting elbows and pipe segments in rigid jumper designs of SCR hang-offs disclosed in U.S. Pat. No. 8,689,882 by Wajnikonis (this inventor) and Leverette. Those inventors state that spools resisting rotational deflections of the SCRs are subject to high torsional loads; bending loads are also mentioned.

Newer riser hang-offs according to WO/2016/191,637 ideally require connectors according to this invention. These connectors are typically subjected to even higher static and fatigue torsional and bending loads than are those experienced in SCR hang-offs according to Wajnikonis and Leverette. In the presently discussed newer designs, the torsional and bending loads tend to be of the same order of high magnitudes.

In both the older and the newer classes of the said SCR and rigid riser hang-offs the effective tensions are very small, the actual or 'wall' tensions in those connectors being governed by so called 'end cap' pressure effects. That implies considerably lower actual or 'wall' tensions than are those typically experienced by known Merlin™ family connectors used for example to connect SCR joints. All the technical terms used here are used in engineering codes and are familiar to those skilled in the art.

Connectors according to this invention can be used to connect pipes made of materials that cannot be welded together (example steel alloys and titanium alloys) or of other materials that are difficult or impossible to weld. Additional fields of industrial application may be listed. Because of their reliability and the extremely low susceptibility to leaks, connectors according to this invention can be used for piping and pipelines in the chemical, onshore or offshore cryogenic installations and in the nuclear industry. In addition to the above features, connectors according to this invention have very slim designs and low weights. Accordingly, they also deserve to be considered for aerospace applications, in particular cryogenic piping.

Low cost, high production volumes of connector components used in piping made of non-metallic materials, like for example plastics may be another possible field of application. Large numbers of very accurately dimensioned plastic boxes and pins used in connectors according to this invention can be mass produced for example by casting or by injection molding. When plastic materials are used, tooling for assembling/disassembling may be low pressure hydraulic or pneumatic.

What is claimed is:

1. A mechanical connector provided with zero-pitch angle threads on substantially matching, substantially frustoconical surfaces of a box and a pin; said mechanical connector being assembled using a fluid pressure which expands said box and contracts said pin in a radial direction, which enables a final assembly stroke in an axial direction that makes up a connection by engaging said zero-pitch angle threads of said box and said pin; whereas said zero-pitch angle threads of said box and said pin can engage only in a correct axial position due to a use of a non-uniform axial pitch of said zero-pitch angle threads, and whereas an excess fluid is removed through fluid outlet ports;

wherein said mechanical connector includes a plurality of splines providing a structural arrangement for transferring a torque between said pin and said box;

whereas said plurality of splines providing said structural arrangement for transferring said torque between said pin and said box can be shaped along a cylindrical segment of said pin and said box, or said plurality of splines providing said structural arrangement for transferring said torque between said pin and said box can be shaped along a tapered surface of said pin and said box.

2. The mechanical connector provided with the zero-pitch angle threads on the substantially matching, substantially frustoconical surfaces of the box and the pin according to claim 1, whereas at least one of said box or said pin is made of a titanium alloy.

3. The mechanical connector provided with the zero-pitch angle threads on the substantially matching, substantially frustoconical surfaces of the box and the pin according to claim 1, whereas at least one of said box or said pin is made of an aluminum alloy.

4. The mechanical connector provided with the zero-pitch angle threads on the substantially matching, substantially frustoconical surfaces of the box and the pin according to claim 1, whereas at least one of said box or said pin is made of a magnesium alloy.

5. The mechanical connector provided with the zero-pitch angle threads on the substantially matching, substantially frustoconical surfaces of the box and the pin according to claim 1, whereas said box and said pin are made of different materials.

6. The mechanical connector provided with the zero-pitch angle threads on the substantially matching, substantially frustoconical surfaces of the box and the pin according to claim 1, whereas at least one of said box or said pin is made of a steel alloy.

7. The mechanical connector provided with the zero-pitch angle threads on the substantially matching, substantially frustoconical surfaces of the box and the pin according to claim 1, whereas at least one of said box or said pin is made of a metallic alloy.

8. The mechanical connector provided with the zero-pitch angle threads on the substantially matching, substantially frustoconical surfaces of the box and the pin according to claim 1, whereas at least one of said box or said pin is made of a non-metallic material.

9. The mechanical connector provided with the zero-pitch angle threads on the substantially matching, substantially frustoconical surfaces of the box and the pin according to claim 1, whereas at least one of said box or said pin utilizes at least one of a lining or a cladding or a weld overlay.

10. The mechanical connector provided with the zero-pitch angle threads on the substantially matching, substantially frustoconical surfaces of the box and the pin according to claim 1, whereas at least one of said box or said pin features one or more grooves located in an area adjacent to a set of nipple seals, said grooves located in said area adjacent to said set of said nipple seals increasing locally a flexibility of said box or said pin in a meridional bending.

11. The mechanical connector provided with the zero-pitch angle threads on the substantially matching frustoconical surfaces of the box and the pin according to claim 1, wherein said mechanical connector includes an at least one dog-clutch tooth designed for transferring the torque between said pin and said box.

12. The mechanical connector provided with the zero-pitch angle threads on the substantially matching frustoconical surfaces of the box and the pin according to claim 1, wherein said mechanical connector includes at least one of:
   a left handed thread interlocked with said zero-pitch angle thread,
   a right handed thread interlocked with said zero-pitch angle thread,
   a left handed thread interlocked with a right handed thread designed for transferring the torque between said pin and said box.

13. The mechanical connector provided with the zero-pitch angle threads on the substantially matching frustoconical surfaces of the box and the pin according to claim 1, wherein said mechanical connector includes a plurality of keys designed for transferring the torque between said pin and said box.

14. The mechanical connector provided with the zero-pitch angle threads on the substantially matching frustoconical surfaces of the box and the pin according to claim 1, wherein said mechanical connector includes a plurality of shear pins designed for transferring the torque between said pin and said box.

* * * * *